(12) United States Patent
Iockheck (10) Patent No.: US 9,016,056 B2
(45) Date of Patent: Apr. 28, 2015

(54) STIRLING CYCLE ENERGY CONVERTER (75) Inventor: Marno Iockheck, Curitiba (BR)

(73) Assignee: ABX Energia LTDA, Parana (BR)

( * ) Notice: Subject to any disclaimer, the term of this patent is extended or adjusted under 35 U.S.C. 154(b) by 430 days.

(21) Appl. No.: 13/582,792

(22) PCT Filed: Mar. 4, 2011

(86) PCT No.: PCT/BR2011/000065
§ 371 (c)(1),
(2), (4) Date: Oct. 31, 2012

(87) PCT Pub. No.: WO2011/106859
PCT Pub. Date: Sep. 9, 2011

(65) Prior Publication Data
US 2013/0061590 A1 Mar. 14, 2013

(30) Foreign Application Priority Data
Mar. 5, 2010 (BR) .................................... 1000624

(51) Int. Cl.
| F01B 29/10 | (2006.01) |
| F02G 1/04 | (2006.01) |
| F02G 1/043 | (2006.01) |
| F02C 1/10 | (2006.01) |
| F03G 6/06 | (2006.01) |
| F02G 1/057 | (2006.01) |

(52) U.S. Cl.
CPC ............ *F02G 1/043* (2013.01); *F02G 2270/10* (2013.01); *F02C 1/105* (2013.01); *F03G 6/068* (2013.01); *Y02E 10/46* (2013.01); *F02G 1/057* (2013.01)

(58) Field of Classification Search
CPC ..................................................... F02G 2270/10
USPC ............................................................ 60/519
See application file for complete search history.

(56) References Cited

U.S. PATENT DOCUMENTS

| 6,195,992 B1 * | 3/2001 | Nommensen .................... 60/519 |
| 8,495,873 B2 * | 7/2013 | Foster .............................. 60/519 |
| 2009/0019846 A1 | 1/2009 | Silver et al. |

* cited by examiner

*Primary Examiner* — Christopher Jetton
(74) *Attorney, Agent, or Firm* — Mark Levy; Hinman, Howard & Kattell, LLP (57) ABSTRACT

The "Energy Converter using Stirling Cycle" refers to the present invention patent request for constructive systems in general, more specifically for an "Energy Converter using Stirling Cycle", which provides mechanical energy by means of conversion carried out by means of the heat flow passage from a thermal energy source to a gas that circulates between sealed units. The system is composed of one or more pairs of chambers, called sealed units, which transfer heat to the gas in alternate way between themselves, by means of the controlled movement of a rotor in the shape of an escutcheon, which exposed the gas between the hot and cold plates alternately so that the gas between the chambers expands and contracts cyclically generating the driving force.

15 Claims, 15 Drawing Sheets

STIRLING CYCLE ENERGY CONVERTER

The present request for invention patent refers to constructive systems in general, more specifically to an "Energy Converter using a Stirling Cycle", which, in accordance to its general characteristics, has the basic principle to provide mechanical energy by conversion made through the passage of a heat flow from one energy source to an energy absorption element, in a way that by means of the energetic flow, the element that transports such energy provides sufficient work for movement of a turbine or a motor.

With specific design and format, the "Energy Converter using Stirling Cycle" uses the Robert Stirling's concept who in 1816 developed the first external combustion motor, although the "Energy Converter using Stirling Cycle" described hereby does not necessarily need combustion, but a heat source, which can be by means of combustion of any kind of fuel, solid, liquid, or gas, as well as other heat sources such as the sun, geothermal, radioactive isotopes, etc. However, the concept is the same as the one created by Robert Stirling.

The present patent request is characterized with the combination of components and processes in a differentiated design, which will comply with the different requirements demanded by the nature of utilization, i.e., an energy conversion system, which operates by means of heating the gas in two units, which operate synchronized, in a way that while one heats the gas in its internal part, the other removes the heat from the gas and this cycle generates the conversion, which remains available on shaft of a motor or a turbine.

The converted energy is proportional to the energy flow that passes through the conversion equipment. The better the elements for energy transfer, heat loss isolation, free flow, either of the energy or the gas, are, the more efficient the converter will be.

The present patent request consist of the utilization of a modern, efficient, safe and functional "Energy Converter using Stirling Cycle" by means of expansion and retraction of the gas in a closed circuit, generally formed by a set of elements and mechanical and constructive solutions incorporated correctly, composing a complete and differentiated constructive system, with exclusive design and proper characteristics, which incorporates a proper and specific structure of the type mechanical, with high durability and resistance and containing perfectly integrated and symmetrically placed in a closed circuit, formed by a set of heating, isolation, transport, expansion elements in order to drive a turbine or a motor by gas pressure, providing mechanical energy on a shaft for the conversion of electrical energy for specific or general use.

The present "Thermo-mechanical Energy Converter" is based on the energy contained in a heat source, the sun, geothermal, combustion, atomic radiation, where it is taken by means of a thermal fluid and conducted in chambers for energy transfer to the gas contained in the chambers in a way that it expands and is converted in mechanical energy on a motor or a turbine shaft so that the gas receives energy in one of the chambers, increasing the pressure and dislocates to the other chamber, whose circuit is removing the gas heat at that moment and in this route, the system will perform the work converting moving a turbine or a motor.

The current art of the technique, due to the long period of other energy forms abundance, did not develop significantly since Mr. Robert Stirling's invention long time ago.

Figure 14:
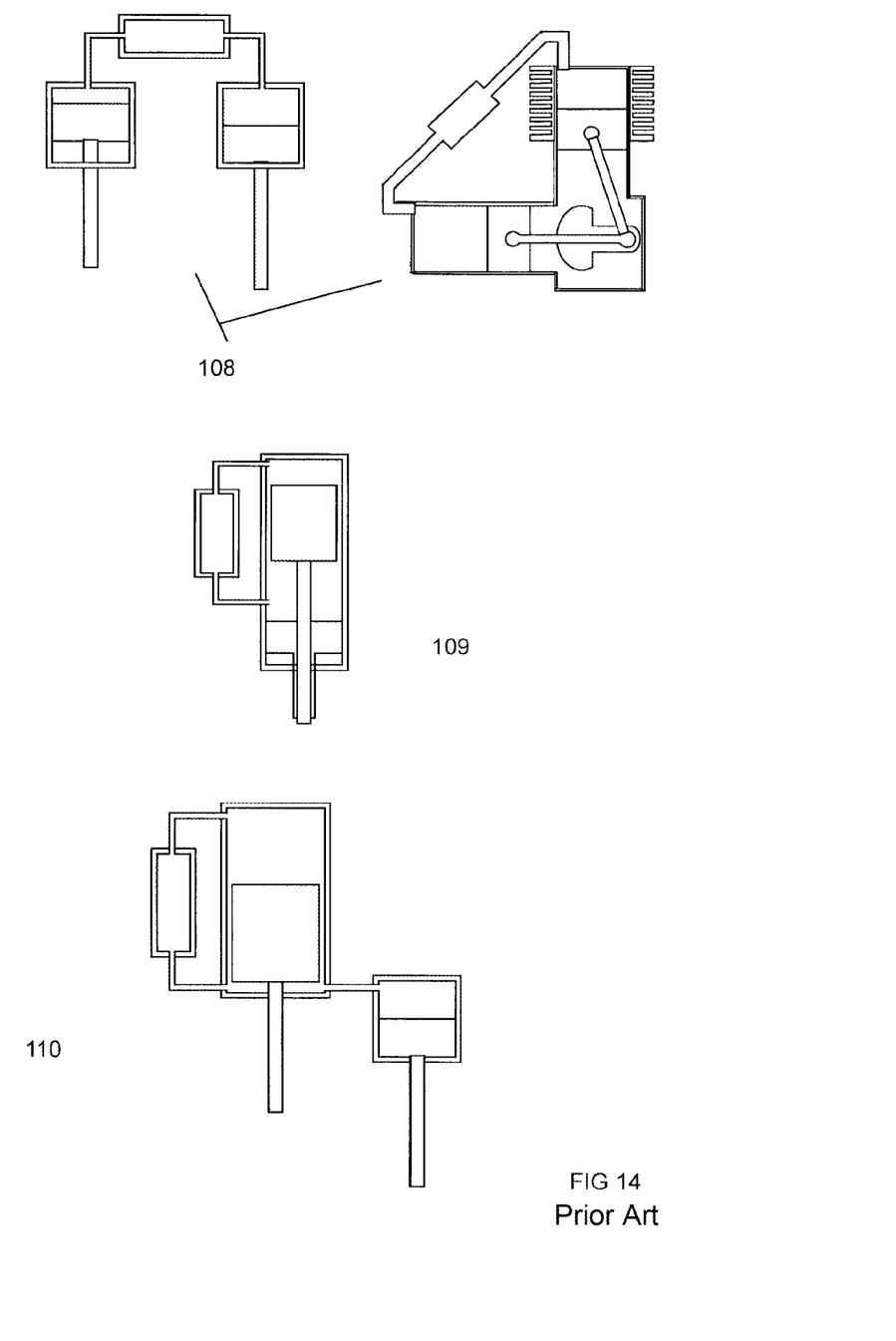
Figure 15:
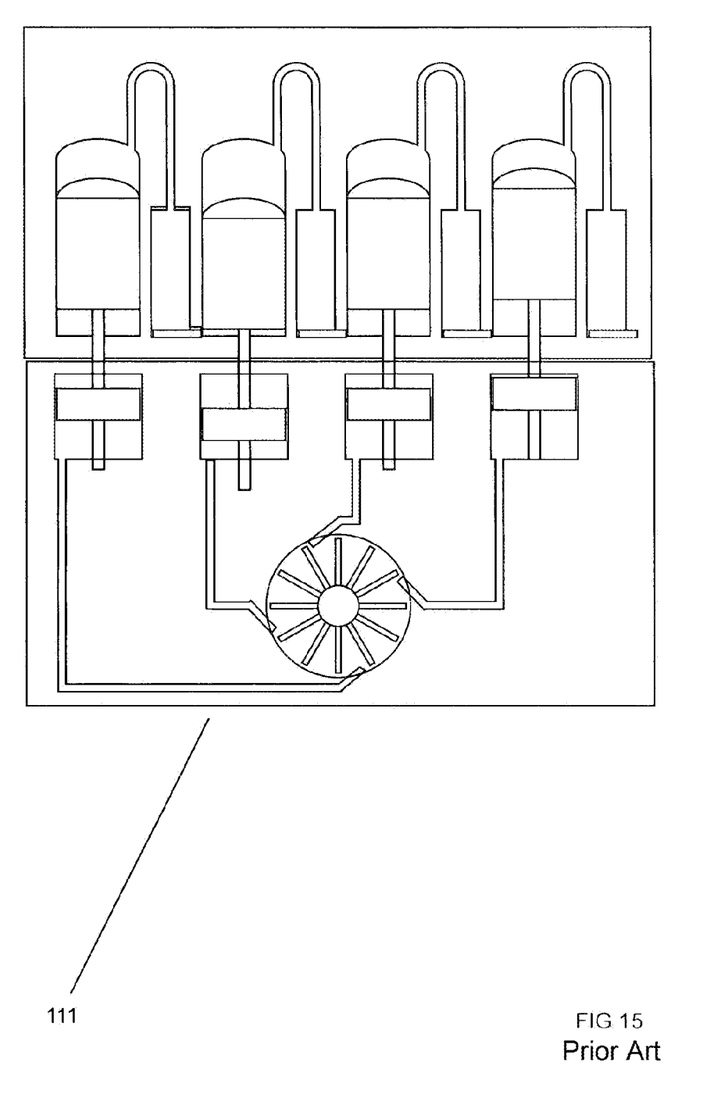

The currently known technologies operate in general by means of pistons, so that they make difficult, due to their geometry, the efficient transfer of heat energy to the gas, and also make large sized projects difficult. The most known models are called Alpha according to indication in 108, on FIG. 14, the model Beta according to 109 on FIG. 14 and the model Gamma according to 110 on FIG. 14. There is also a new model called quasiturbine, which operates with one rotor, normally with 4 chambers and four thermal transfer regions, two hot and two cold, however there is a complex articulated system that forms the rotor, which rotates due to the gas pressure force inside an ellipsoidal formatted body and in the same way as the three models mentioned above, makes the dimensioning of large system difficult. Recently, William Beale from Sunpower, Inc developed a new model according to FIG. 15, drawing 111, whose embodiment includes four cylinders asynchronous at ninety degrees based on the Alpha free piston Stirling's model, also with a gas turbine, on the other hand, the main embodiment proposal presented herein is obtaining high power system. The most of the models operate with volumetric variation in the pressure chambers and lots of them suffer the influence of the external environment pressure. Anyway, all existing models shown require the gas return to its origin in order to receive the energy to generate the work, which obliges the projects to maintain the converter relatively large in dimensions per power unit.

From these inconveniencies, an "Energy Converter using Stirling Cycle" is designed, which basic concept is totally based on a proper structure that presents the basic and essential characteristics of total simplicity, efficiency in the energetic transfer and the conversion, versatility and integration, characterized also by the facility in the implementations, especially by the flexibility in the use of different heat sources, renewable, not renewable, from fuel, etc.; involving a low number of components, reducing the costs and the manufacturing, assembly and maintenance time;

The proposed project consists of a new solution that, due to its geometry, configures an accelerated process of thermal transfer, permits the implementation of thermal units in consortium facilitating big-sized systems, the symmetry guarantees the equilibrium and excellent balancing, which does not exist in the current systems, and, one of the most important points, the continuous utilization of the energy flow and, also due to its proper characteristics, it has the property to easily exit the inertial starting state.

Figure 1:
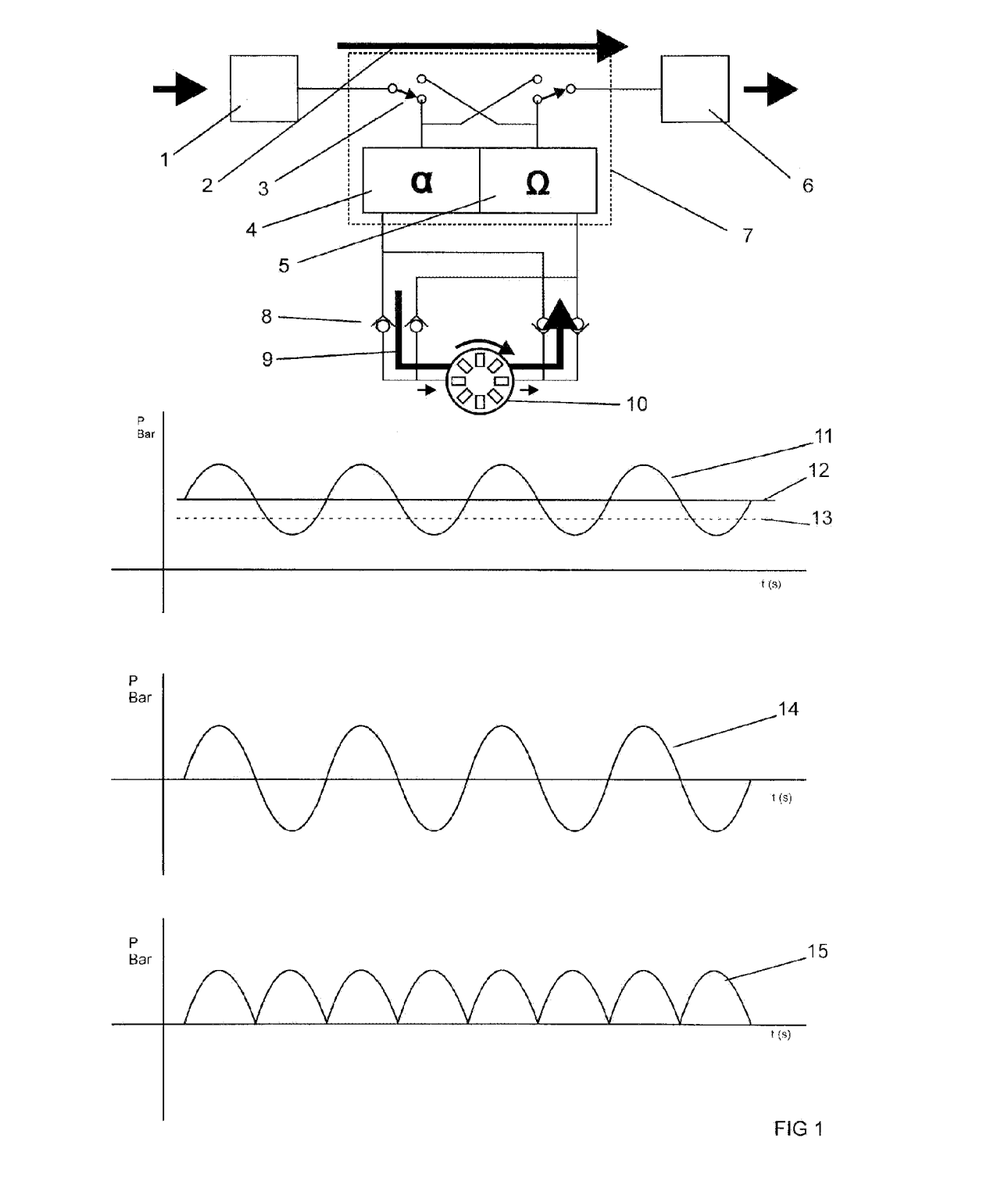

The objectives, advantages and other important characteristics of the patent in question can be easily understood when read together with the figures attached, whereas:

FIG. 1 represents a block diagram, which describes the thermal energy flow, the transfer to the gas inside the two sealed units, however interconnected by means of a circuit that forces the gas passage through a turbine, so that: a thermal energy enters through block 1, takes the direction 2 continuously and with no interruptions, a part being transformed and a part being released to the environment through block 6, so that during this flow, the energy is transferred to the gas in sealed units 4 and 5, so that in a given moment the energy is transferred to the gas in sealed unit 4 expanding the gas and removed to sealed unit 5 dislocating itself to the external environment and in the following phase, the transfer operates in the opposite direction, the energy is deposited in sealed unit 5 and removed to sealed unit 4 dislocating itself to block 6 for release, obviously a big part of the energy is transferred to generate work and conversion of energy by the turbine. In 3, the energy flow direction is presented, which enters once through unit 4 once through unit 5, in 8, the unidirectional flow valves are indicated that allow the gas flow only in the direction indicated so that on the presented diagram, the gas flow 9 always enters from the same side of the turbine 10 guaranteeing a continuous movement in the same direction. The three graphs on FIG. 1 indicate, 11—the gas pressure curve in each sealed unit when in operation, and 12—the indicative line of the system average pressure, in 13—the indication of the system average pressure without the energy flow from source. In 14, the differential pressure behavior is indicated between the sealed units 4 and 5, in 15—the pressure behavior at the turbine inlet after the passage through the directional valves. For this system, it is considered that there is an inert gas in the sealed units under pressure dimensioned to maintain it safe due to the maximum operation pressures. There are the following considerations: the helium gas, highly indicated, combines safety and the property to have a high thermal conductibility, the heat absorption occurs around ten times faster than with air or nitrogen.

The sealed units are pressurized in a way that the higher the pressure, the higher the capacity of energetic conversion per volume unit, exactly because the higher the number of gas molecules, the higher the gas matter volume existing to transport the energy. The equipment shall be correctly dimensioned in order to operate in safe conditions. As there so no any moving element exposed on the external side, the present project does not have a volumetric variation during the cycle and does not suffer any influence from the atmospheric pressure.

Figure 2:
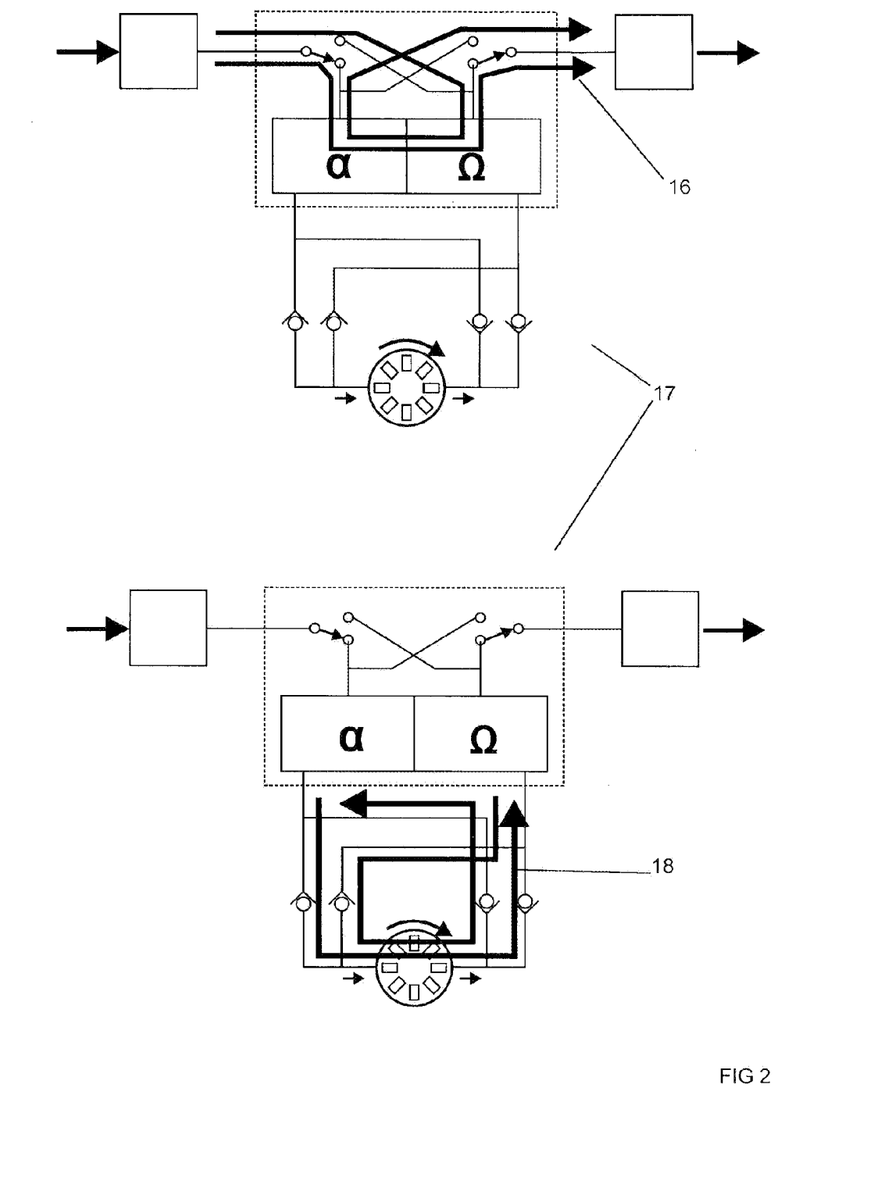

On FIG. 2 there are two blocks diagrams representing the same system 17, however in 16 it indicates the energy flow due to the rotor turns to be explained in details hereunder, observing that in a given moment, the energetic flow enters through sealed unit 4 and goes out through sealed unit 5 and in the following phase it is the opposite, it enters through sealed unit 5 and goes out through 4. In 18, the gas flow is indicated, which due to the sequence and continuous exchange of energy transfer, once comes from sealed unit 4 with higher pressure, entering the turbine and once comes from sealed unit 5 then it is with higher pressure entering the turbine.

Figure 3:
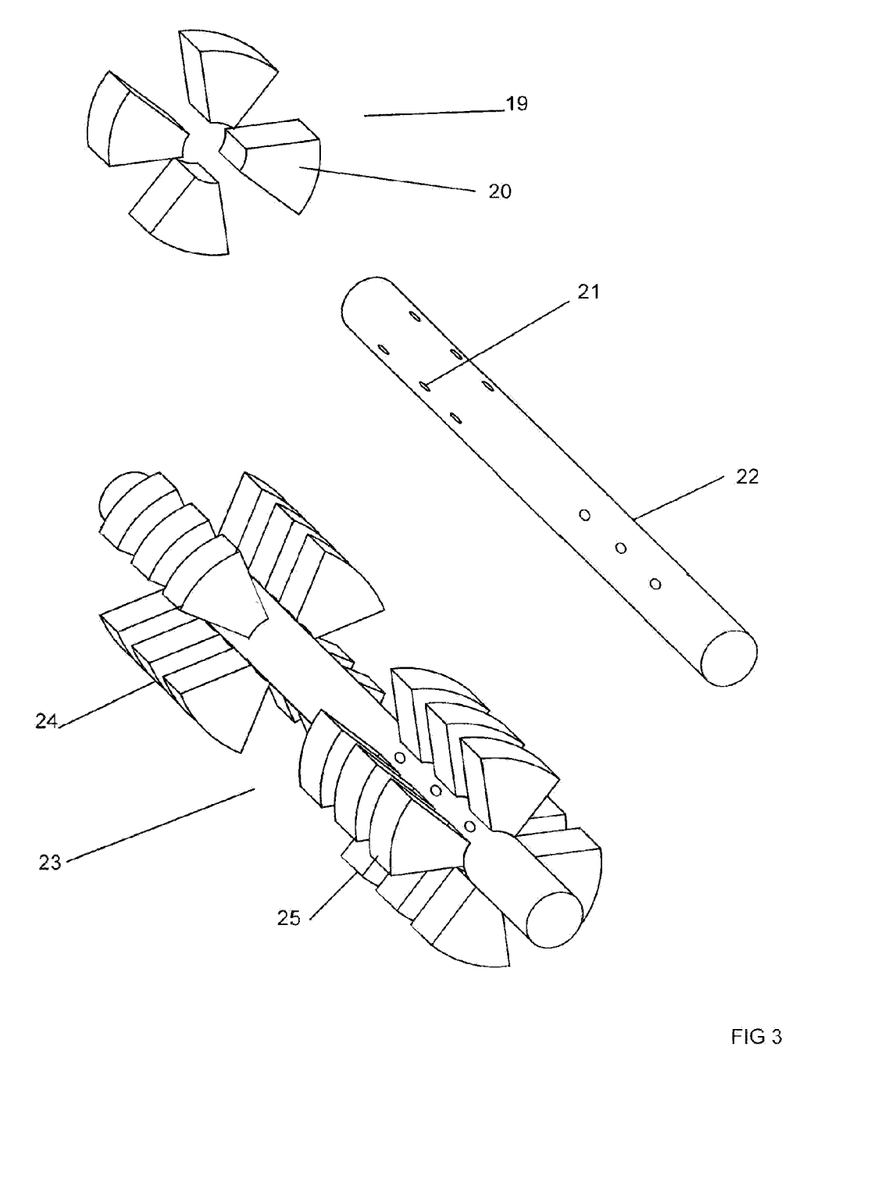

On FIG. 3, it is shown how the rotor is built. The rotor is formed by a shaft 22, escutcheons 19 made of thermal isolating material, each escutcheon is formed by blades 20, the shaft is perforated 21 for the gas passage during the expansion and retraction process. The assembled rotor is indicated on 23, a part with escutcheons, all aligned symmetrically and spaced 25 and another part with equal dimensions with the same number of escutcheons, however spaced to provide the symmetric effect at the thermal exchange by the energy flow. The function of the rotor with escutcheons is provide the gas dislocation in a circular manner inside each sealed unit, dislocating continuously it from the hot and cold regions and vice versa, it shall be observed and understood that this rotor does not exercise any pressure, or in another way, the gas does not exercise any pressure on the rotor blades, because in each sealed unit, the rotor always operates in full equilibrium of pressure, it serves exclusively to move the gas in a balanced way. Another important point to be considered is that the blades, which form the escutcheons do not touch the rotor, there is no direct friction, because they serve only to dislocate the gas volume inside the chambers in one region or another.

Figure 4:
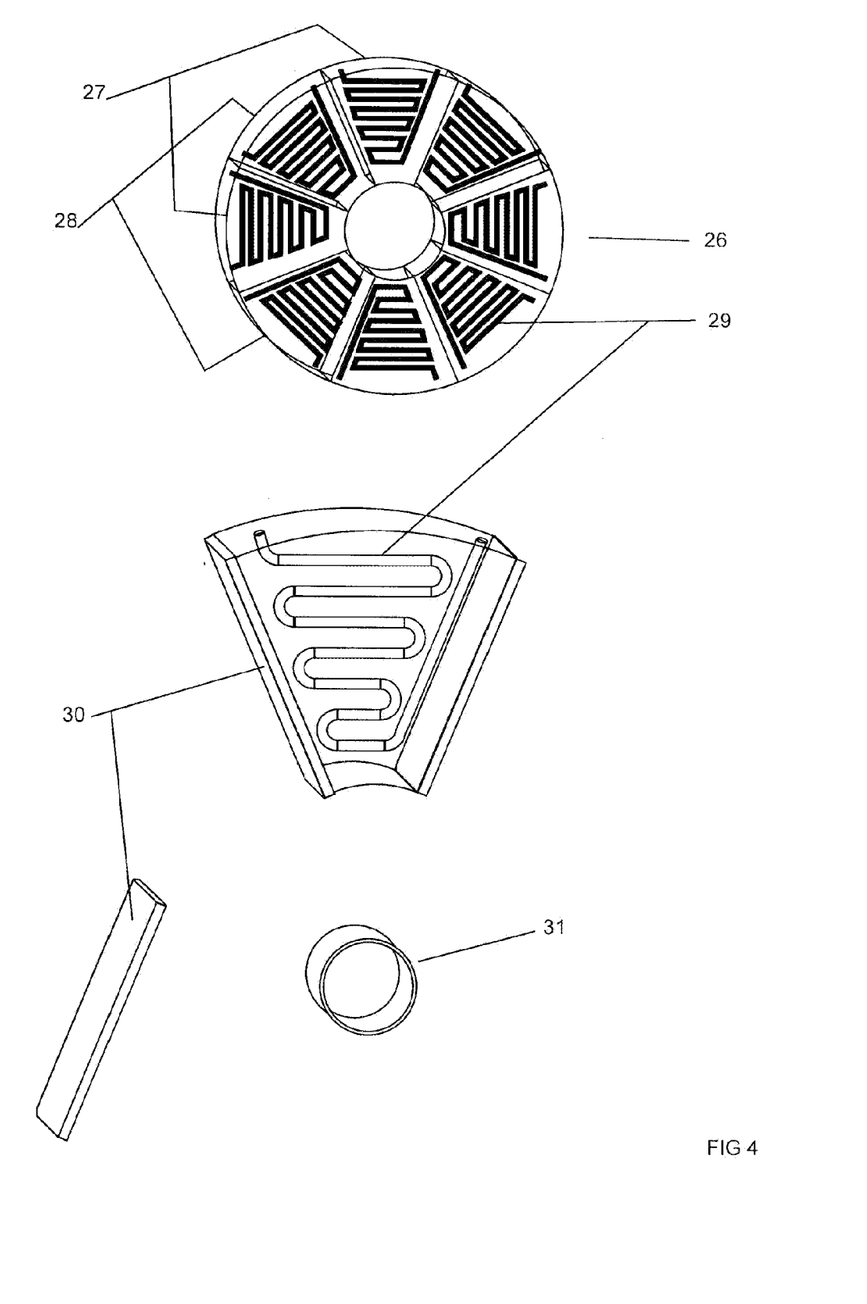

On FIG. 4, one of the most important items of the project is shown, the thermal transfer disk. The concept is the following: in order to have the best possible output in a closed circuit gas system, the gas shall remain in contact in the closest possible way with the heat transmission element, so that the energetic transfer is efficient either during the energy supply or energy removal process, i.e., in the closest possible contact with the heat removal element. Thus, the energetic, thermal transfer disk is constituted of hot segments 27 and cold segments 28 alternately, isolated among themselves by thermal insulators 30. Each segment is formed by a fraction of the disk with sharp edges in a perfect angle directed to the center, with thermal conducting material and good thermal emission property, inserted through a duct 29 through which the thermal fluid is transported hot or cold according to the case. The two surfaces of the plates of these hot and cold segments that form the disk are in contact with the gas and are perfectly parallel to other plates in the same temperature conditions and the gas between them will be heated or cooled relatively fast. The ring 31 is made of thermal isolating material in order to reduce the energetic loss for the shaft. With this geometry and the thermal transfer concept, by means of the rotor turns control which is independent, the system allows a full control in order to always operate in optimum energetic transfer condition, a condition which not favorable in the piston systems.

Figure 5:
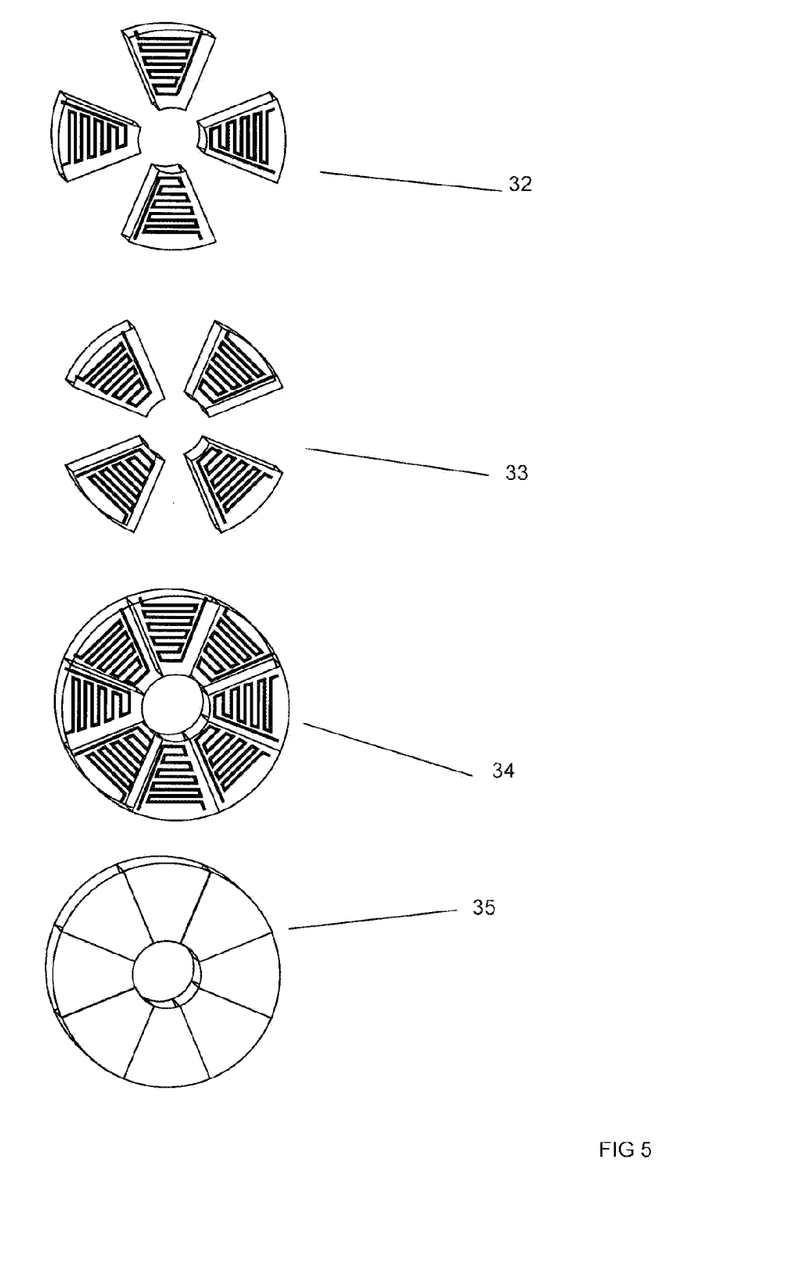

On FIG. 5, an energetic exchange disk is indicated with hot poles 32 and cold poles 33 and their assembled concept 34. On 35, a thermal isolating disk is shown, which is used at the sealed units ends in order to reduce the thermal losses for the housing and the external environment.

Figure 6:
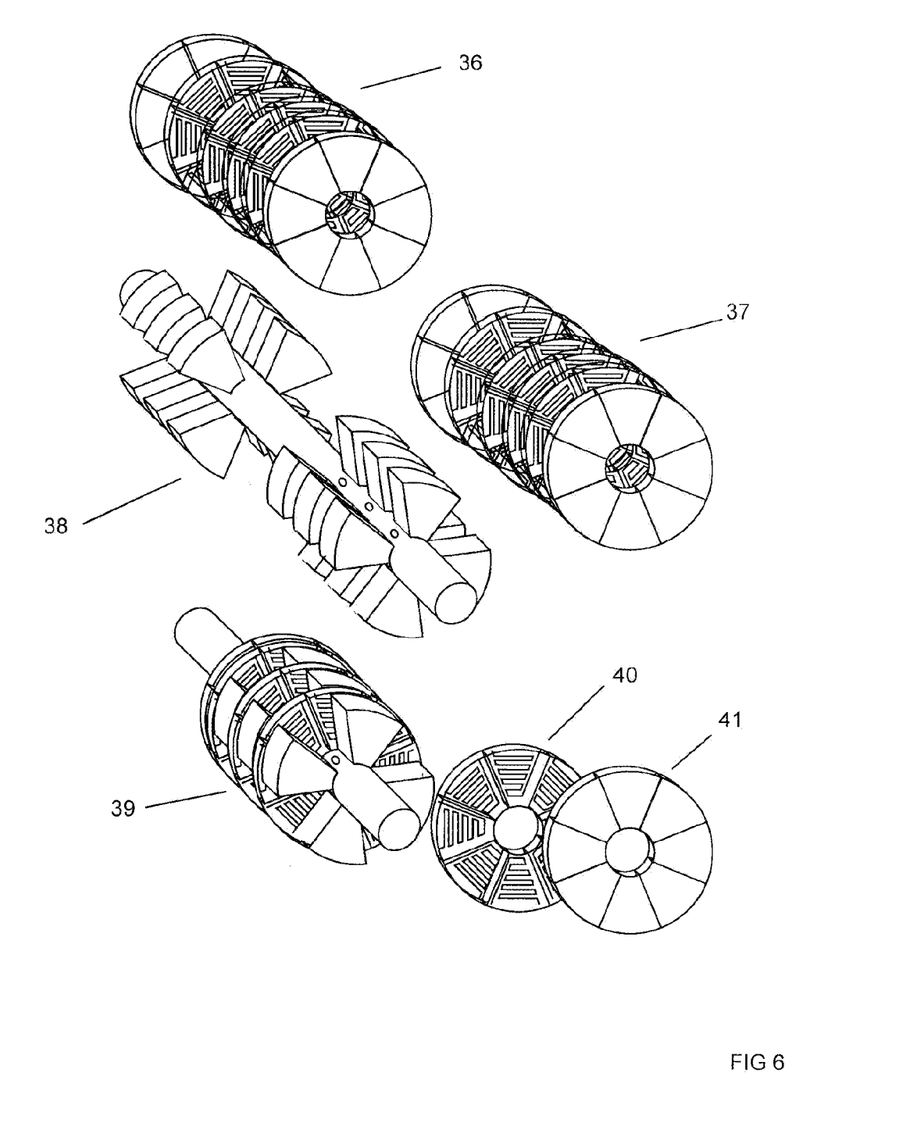

On FIG. 6, it is shown how the main elements that constitute the energy transfer system for the gas are mounted, as well as the removal of the gas energy inside the sealed units. On 38, the rotor is observed for an equipment with two sealed units and four poles, in this sample drawing, the rotor is shown with two sections, one with three symmetrical escutcheons, and another section with other three symmetrical escutcheons spaced from the first section, it is also observed in this item, the holes that facilitate the passage of the gas during the process. On 36 and 37, it is shown how the disks that form the stator are distributed, the disks are fixed on the housing and operate statically and totally symmetrically all disks and are also aligned to what refers to the sealed units, while the rotor turns between its grids. The disks are mounted between the escutcheons of the stator and another disk at the extremity that according to the drawing, the disk indicated as 40 is the last disk of the set thermal transfer and after it is introduced from the thermal isolation disk 41 in a way so that the energy, which is introduced in the system is fully available to execute the gas expansion, improving the set output. With this detail, it is observed how there is a symmetrical exchange between the energy input and output, which occur respectively between the sealed units, while in one the gas remains completely exposed to the hot grids heat, in the other the gas remains completely exposed to the removal of heat through the cold grids according to the rotor turns. Reminding that all grids remain constantly and continuously under heating and interconnected with the other grids, which in the same way remain constantly and continuously under cooling, thus confirming the process of energy transfer to the gas and its removal in order to generate the expansion and the retraction of the gas to create the conversion of the thermal energy into mechanical energy. Thus, it is observed that the present project allows free sizing of the number of escutcheons and the number of poles in order to make it suitable either for small applications, or for large installations.

Figure 7:
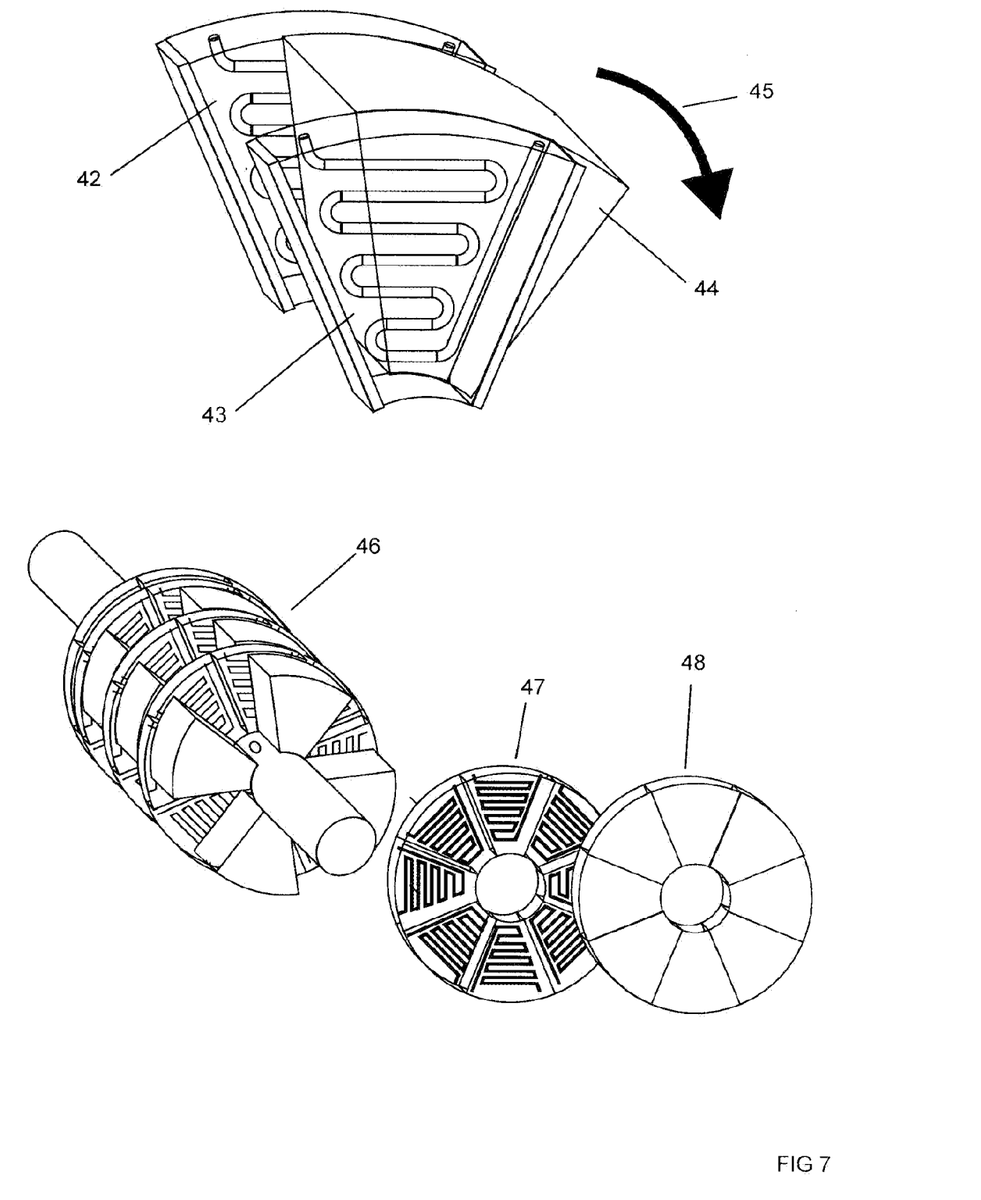

On FIG. 7 it is clearly demonstrated how the thermal exchange process functions, in 44 one of the blades that form the escutcheon is indicated, which is the most important element of the rotor, this blade is made of thermal isolating material and occupies almost totally the space between the disk of the stator and the one that dislocates the gas between the disk, exposing it cyclically to the hot and the cold zones, for better understanding, the segments of disks 42 and 43 are grids, which operate in same thermal conditions so that the gas between these plates executes the thermal exchange with high efficiency, in 45, the blade movement is indicated, which continuously provides the gas dragging transporting it from the hot zones to the cold zones and vice-versa, generating expansion and retraction. Immediately below the same figure, there are the constructive details again, 46 is the stator and rotor aspect, 47 is the thermal disk and 48 is the thermal isolating disk at the extremities.

Figure 8:
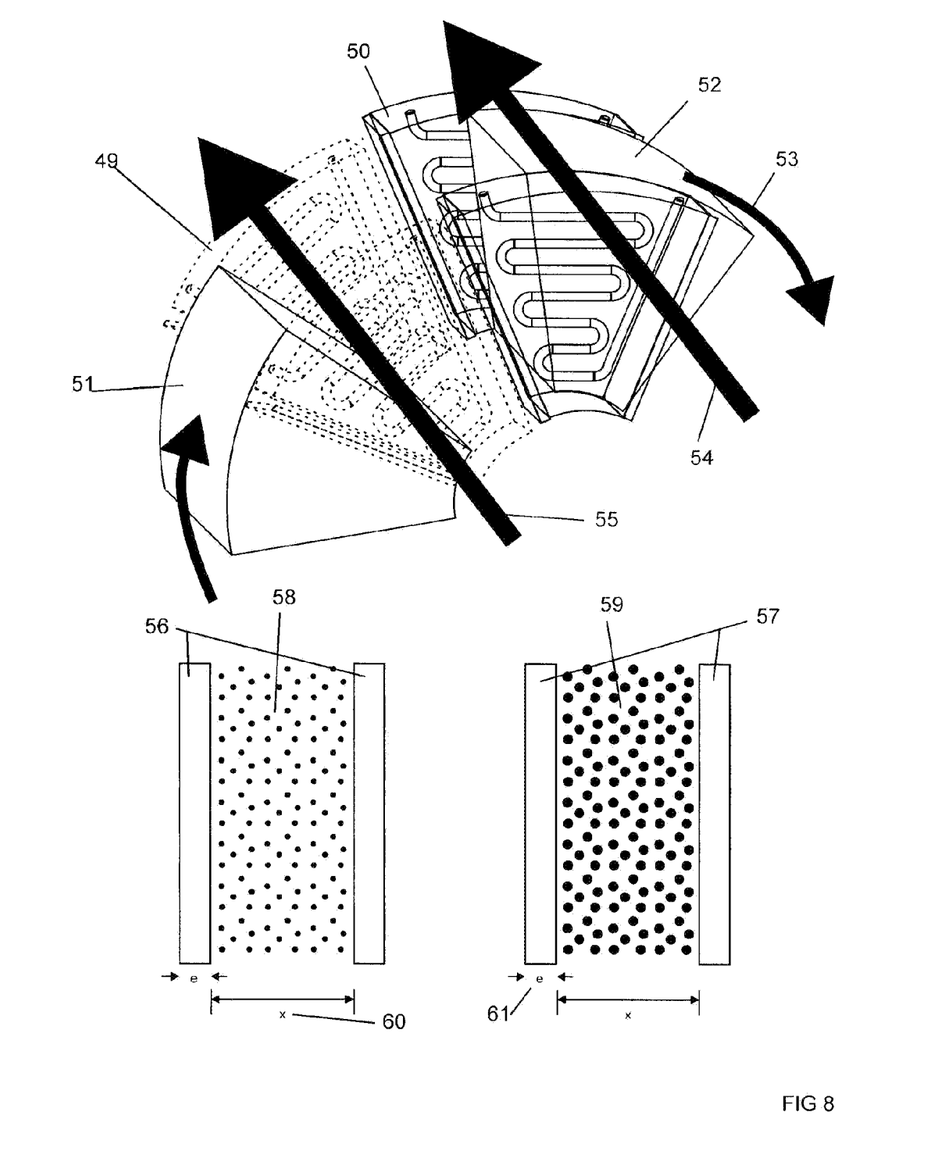

FIG. 8 is highly clarifying, the arrow indicated by 5 defines the region that is always cold, so all stator grids aligned to this arrows are always removing heat from the gas through thermal fluid, which passes through them, on the other hand, the arrow indicated by 54 defines the region that is always hot and this all grids of the stator aligned to this arrow will be always supplying heat through the thermal fluid, which passes through them. The grid 49 and all grids aligned to it, thermal disk segments, are cold, the grid 50 and all grids aligned to it, are hot. The blades 51 and 52 are a part of the rotor and keep among them all gas from the sealed units, exposing it to the hot and cold regions in sequence. Below there is the longitudinal view of the gas between the hot and cold grids. In 56, the cold grids are indicated, the gas under retraction in 58, in 57 the hot grids, the gas under expansion in 59, the grids thickness in 61, the distance between the grids in 60. The smaller the distance "x" indicated by 60 between the grids is, the higher the thermal transfer speed and consequently higher the rotor turning will be, allowing, on his turn, the reduction of the system dimensions for the same power.

Figure 9:
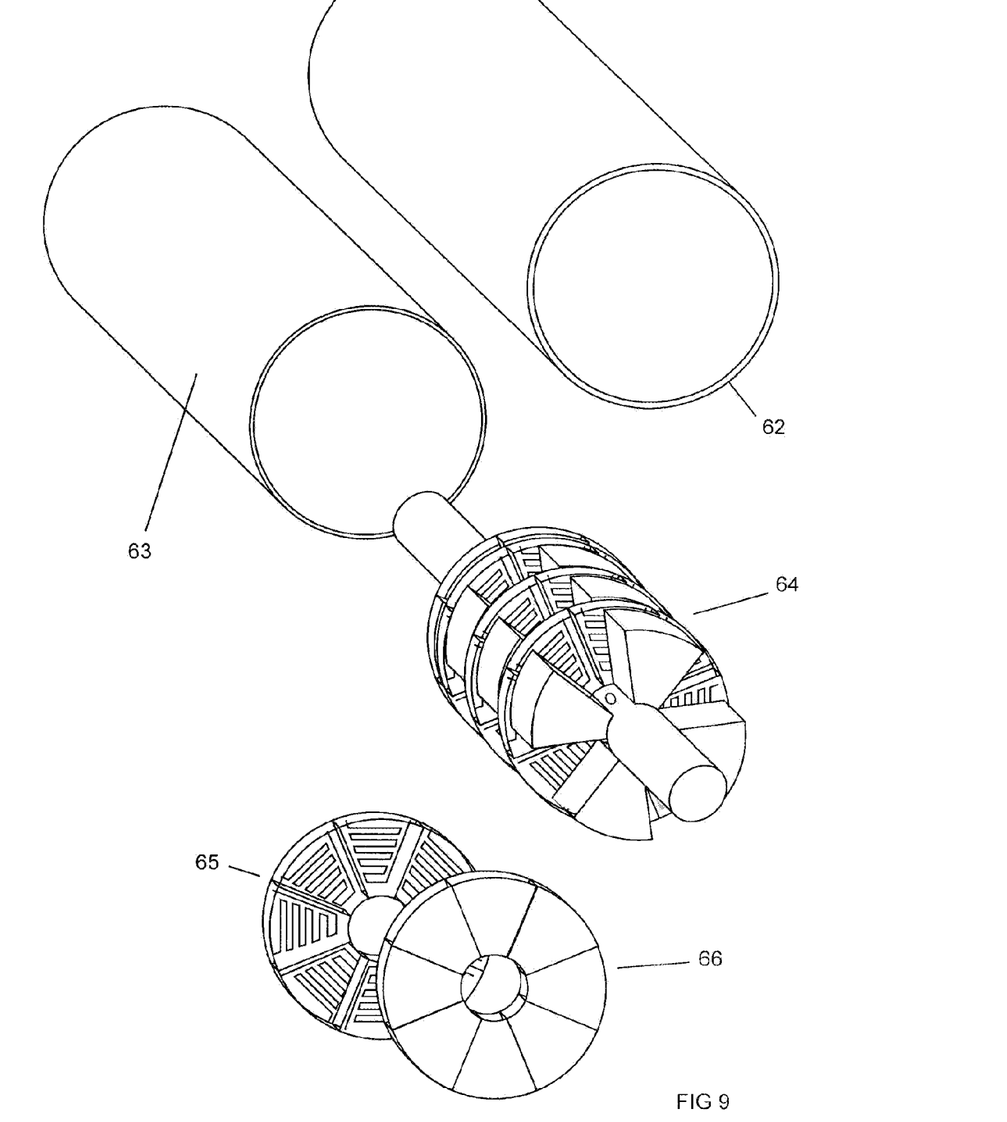

FIG. 9 shows again one of the segments of rotor 64, the housing 62 and the thermal isolating cylinder 63, which has the function to isolate, reduce the loss of the heat exchange elements, hot and cold disks and the gas, with the external environment.

Figure 10:
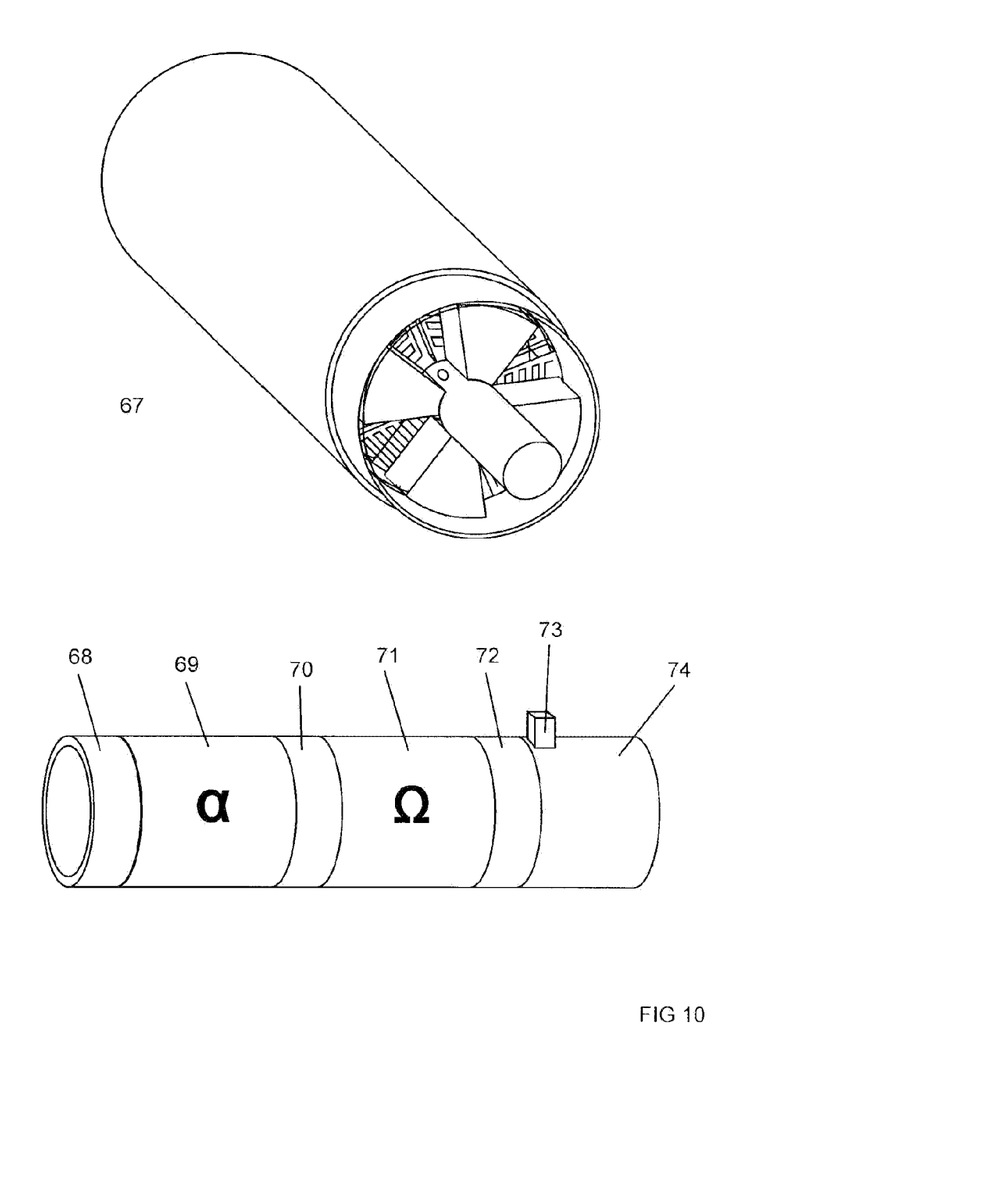

On FIG. 10 the equipment, already in its final shape, in 67 the detail of the aspect of one sealed unit, the rotor can be seen, as well as a part of the stator, the thermal isolating cylinder and the housing. This unit is completely sealed, and there is only one duct, not detailed on the drawing, from where the gas passes from this sealed unit to the other, by means of a turbine or motor. At the bottom, on the same figure, there are the converter, the front segment 68, a lid with thermal isolation duct passage and sealing, the alpha sealed unit 69, one segment of the thermal isolation and sealing 70, the omega sealed unit 71, one segment of the thermal isolation and sealing 72, a flow direction valve module 73 and a turbine 74. Detailing of the mechanical couplings is not a part of the present work.

Figure 11:
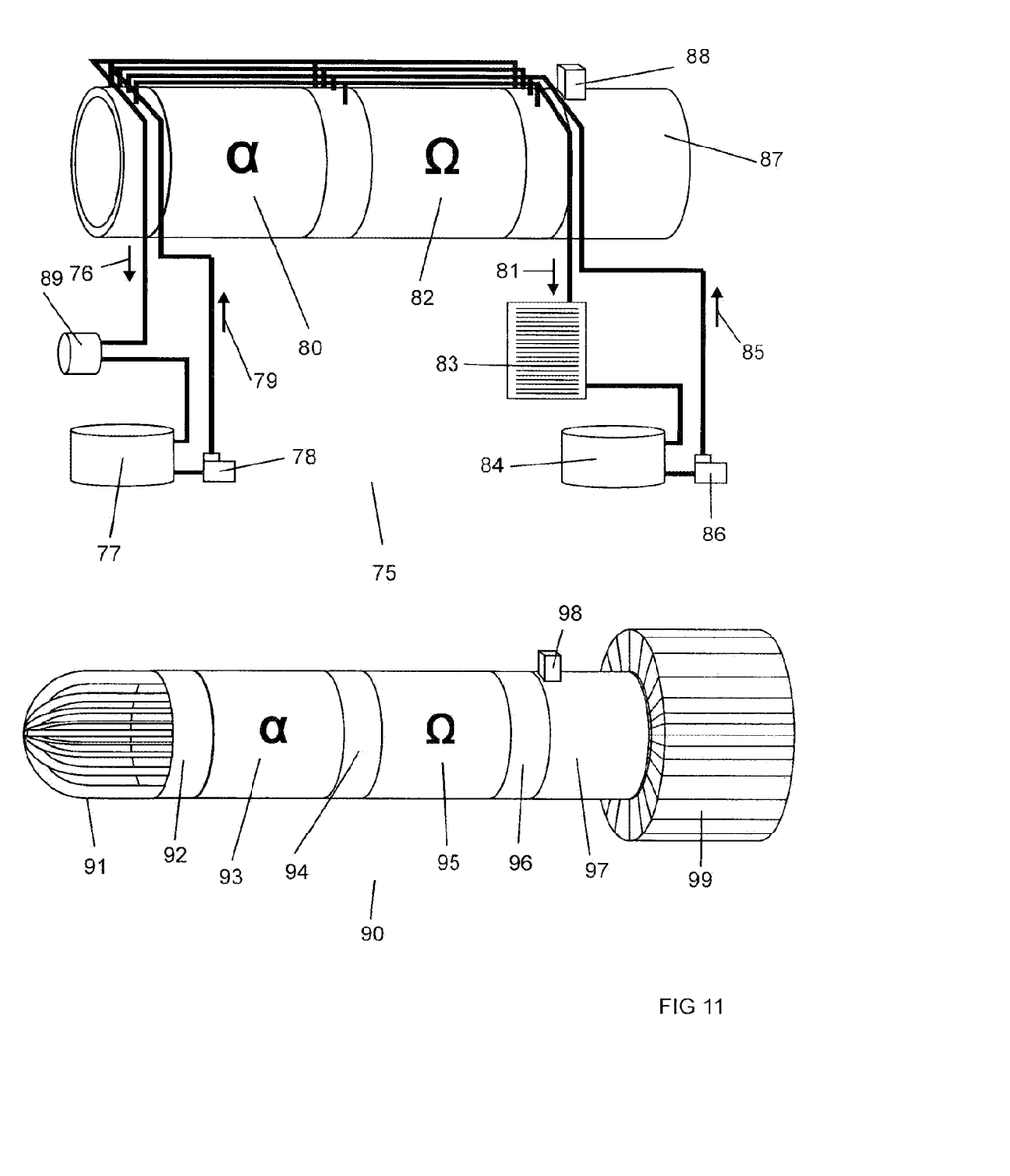

FIG. 11 describes in general two embodiments for installation and application, the first in 75 indicates a large-size installation constituted by a heater 89 whose energy can be provided by solar energy concentrators, geothermal, fuel of any kind, solid, liquid, gas, renewable or not renewable and through heating by means of atomic energy with radioactive isotopes, an isolated thermal fluid tank 77, a booster pump for the fluid circulation 78, the sealed units for thermal transfer, gas expansion and retraction 80 and 82, the cooler 83, the cold thermal fluid tank 84, the booster pump for cold fluid 86, the directional valve module 88, the turbine 87 and the indication of the thermal fluids flow, 79 and 76, respectively, the hot fluid input and output, and 85 and 81, the cold fluid input and output. On the same figure, below, 90, a small-sized application, heating receiver 91 coupled to the set, coupling lid, pumping and isolation 92, sealed unit 93, isolation segment 94, sealed unit 95, isolation segment 96, directional valve module 98, turbine 97 and the heat sink 99.

Figure 12:
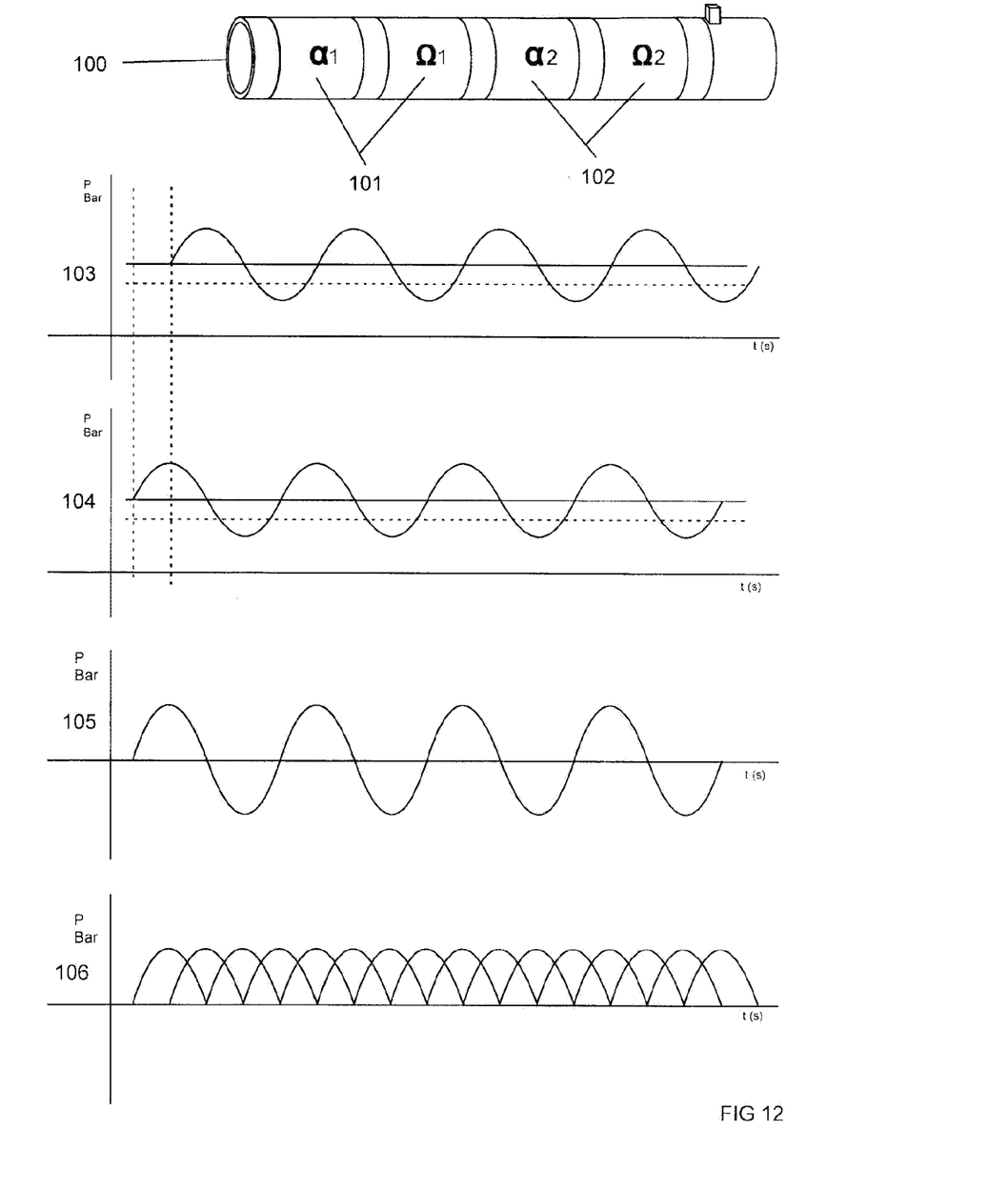

FIG. 12 indicates equipment 100 with a system with two sets of sealed units, 101 and 102, indicating the flexibility to build, with the same idea and concept, multiple phase systems. Below, 103 and 104 indicate, respectively, the behavior of the gas expansion and retraction cycles between the two sets of sealed units, in 105 the relative behavior that occurs in each set of sealed units and in 106 the resulting from the gas flow in the turbines. In brief, this figure and the diagrams indicate the feasibility of this concept use in large projects.

Figure 13:
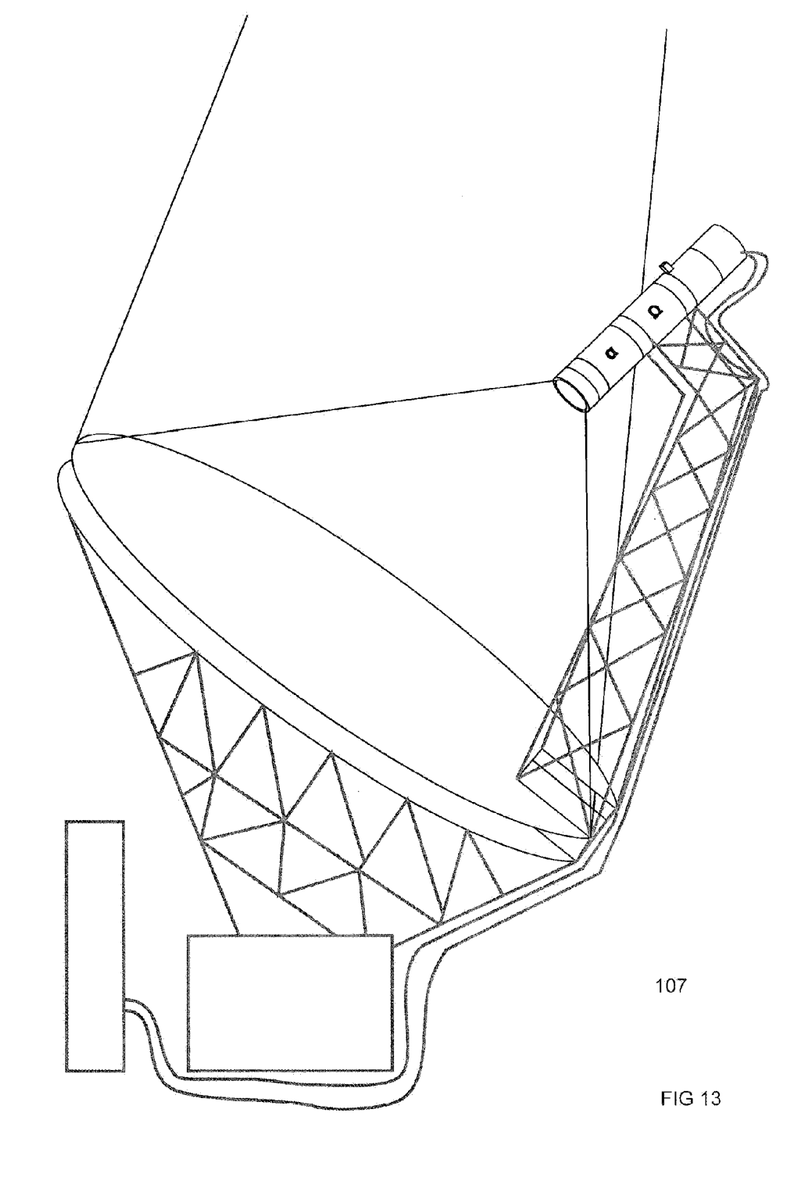

On FIG. 13, the application of equipment 107 is indicated, with smaller size, in solar systems with mirror plates for energy concentration. The sun deposits on the surface of the earth an average of 1000 Watts of energy per square meter, concentrators of various concepts can be used to direct the energy and conduct it in order to generate a flow useful for the proposed conversion system.

The "Energy Converter using Stirling Cycle" proposed herein provides high flexibility to small and large installations, high safety when using, considering the correct technical procedure for its dimensioning, its construction and application, strength due to characteristics such as: lowest noise, inexistence of shocks and impacts, process simplicity, applicability from small isolated installations, residential, commercial and in distributed systems.

Considering everything exposed here above, it is about a system that will be well received by the electric, air and space companies, a governmental organs, industries and users in general, it presents numberless advantages, such as: high safety, reliability and agility under application; high output and performance in its application due to its general concept; commodity and safety for the users; high durability and resistance, combined to a low wear of the set as a whole; costs fully accessible with reference to similar processes and technologies, which provides a great cost/benefit ratio; practical and safe utilization by any user; full thermal and pressure protection; low construction time; inexistence of used material loss; highest final output; and certainty to have a product that fully complies with the basic conditions necessary for its application, such as safety, durability and practice.

All these attributes allow classifying the "Energy Converter using Stirling Cycle" as a totally versatile, efficient, precise, practical, ecological, and safe means to carry out an useful job or for thermo-mechanical conversion of energy in a clean, renewable way to be accepted by the energy generation companies and by the society, being also very easy to operate and maintain, combined to the high performance and excellent general characteristics, however the dimensions and installation forms may vary directly according to the necessity of the environment or the project.

The invention claimed is:

1. An energy converter using the Stirling cycle, having at least two sealed chambers, comprising hot sections and cold sections, the converter comprising:

at least two sets of stator cylindrical disks, segmented and interconnected by means of hot sections and cold sections, both in the format of fractions of a cylindrical disk, each equipped with parallel plates and ducts or internal serpentines, through which the hot and cold fluids pass, respectively, to heat and cool working gas that passes between plates; and a central rotor formed by a hollow cylindrical shaft, limited to its respective chamber, externally equipped with two sets of escutcheons, one set for each of said chambers, formed by solid blades of thermal isolating material in the format of fractions of a cylindrical disk, placed symmetrically and interconnected by hollowed sections;

whereby the rotation of said central rotor dislocates the working gas between the hot and cold sections of the cylindrical disks, providing expansion and retraction of the gas, respectively, creating pressure differentials that force the passage of the gas through a turbine and thereafter towards the chamber with the lower pressure.

2. The energy converter using the Stirling cycle according to claim 1, further comprising rectangular plates for thermal isolation between the sides of the hot and cold sections of the stator cylinders.

3. The energy converter using the Stirling cycle according to claim 1, further comprising central rings for thermal isolation that separate without contacting the bases of the hot and cold sections that form the stator of the rotating rotor in order to minimize the heat flow between a rotor shaft and the stator.

4. The energy converter using the Stirling cycle according to claim 1, further comprising a thermal isolation cylinder inside said sealed chambers for containing the rotor, the stator and the gas, and providing isolation therefor from the external housing.

5. The energy converter using the Stirling cycle according to claim 1, wherein the stator cylinder disks have at least two hot sections and an equal number of cold sections.

6. The energy converter using the Stirling cycle according to claim 1, wherein the rotor escutcheons comprise thermal isolating symmetrical material with one half the sum of the number of hot and cold sections of each stator disk, which occupies the whole space of the gas alternately between the hot and cold zones.

7. The energy converter using the Stirling cycle according to claim 1, wherein the hot and cold thermal fluids circulate inside the ducts or serpentines, heating or cooling the side plates of the cylindrical disk to generate expansion and retraction of said gas, respectively, and to generate work.

8. The energy converter using the Stirling cycle according to claim 1, further comprising a central rotor shaft common to all sealed chambers.

9. The energy converter using the Stirling cycle according to claim 1, wherein the central rotor shaft contains perforations limited to the respective chambers thereof for the free passage of the gas among the hollow spaces of the rotor and among the hollow blades of the escutcheons.

10. The energy converter using the Stirling cycle according to claim 1, wherein the central rotor shaft contains a set of escutcheons for each sealed chamber, each set of escutcheons being equipped with blades, placed alternately in relation to each other, to operate rotationally and in continuous cycle.

11. The energy converter using the Stirling cycle according to claim 1, wherein the stator disks are fixed on the internal walls of the outer boundary of said sealed chambers.

12. The energy converter using the Stirling cycle according to claim 1, wherein the converter comprises more than two sealed chambers being a multiple of two, allowing multiphase systems to serve large projects.

13. The energy converter using the Stirling cycle according to claim 1, further comprising a motor shaft and wherein the rotor shaft operates inside the sealed chambers independently from said motor shaft.

14. The energy converter using the Stirling cycle according to claim 1, wherein said at least two sealed chambers are combined by means of a duct or an external circuit, which passes through a turbine for converting the gas flow into mechanical energy.

15. The energy converter using the Stirling cycle according to claim 1, wherein said gas comprises Helium gas as a working fluid.

\* \* \* \* \*